United States Patent
Xu et al.

(10) Patent No.: US 7,835,744 B2
(45) Date of Patent: Nov. 16, 2010

(54) HANDOVER METHOD AND APPARATUS IN DIGITAL MULTIMEDIA BROADCASTING SYSTEM

(75) Inventors: Yiling Xu, Suwon-si (KR); Jae-Yeon Song, Seoul (KR); Ki-Ho Jung, Gwacheon-si (KR)

(73) Assignee: Samsung Electronics Co., Ltd. (KR)

( * ) Notice: Subject to any disclaimer, the term of this patent is extended or adjusted under 35 U.S.C. 154(b) by 1112 days.

(21) Appl. No.: 11/513,851

(22) Filed: Aug. 31, 2006

(65) Prior Publication Data

US 2007/0064652 A1    Mar. 22, 2007

(30) Foreign Application Priority Data

Aug. 31, 2005  (KR) .................. 10-2005-0080979

(51) Int. Cl.
*H04W 88/02* (2009.01)
(52) U.S. Cl. ...................... 455/436; 455/450
(58) Field of Classification Search ............. 370/312, 370/331, 392, 329, 436, 450; 455/522, 432.1, 455/456; 725/52, 105, 118
See application file for complete search history.

(56) References Cited

U.S. PATENT DOCUMENTS

2008/0081642 A1* 4/2008 Xu et al. ............... 455/456.5
2008/0170490 A1* 7/2008 Connors et al. ........... 370/203
2008/0170531 A1* 7/2008 Petry et al. .............. 370/312

FOREIGN PATENT DOCUMENTS

| KR | 1020010046048 | 6/2001 |
| KR | 1020050063614 | 6/2005 |
| WO | WO 2004/023695 | 3/2004 |
| WO | WO 2004/057762 | 7/2004 |
| WO | WO 2004/102964 | 11/2004 |

\* cited by examiner

*Primary Examiner*—Diane Mizrahi
(74) *Attorney, Agent, or Firm*—The Farrell Law Firm, LLP

(57) ABSTRACT

A handover method and apparatus in a digital multimedia broadcasting (DMB) system that transmits/receives broadcast data through a frame group using different frequencies. A handover method includes receiving a first frame group header at a serving frequency, and receiving a burst of the desired service at the serving frequency according to a burst arrival time; calculating a first relative start time of a next frame group header; turning power off until a current time arrives at a next header arrival time; receiving a second frame group header at a searching frequency, and acquiring service information of the searching frequency necessary for handover to the searching frequency; returning to the serving frequency and turning the power off; and comparing signal power/quality of the listened frequencies with each other to select a best frequency, and switching to the selected frequency using the acquired corresponding service information.

10 Claims, 10 Drawing Sheets

HANDOVER METHOD AND APPARATUS IN DIGITAL MULTIMEDIA BROADCASTING SYSTEM

PRIORITY

This application claims the benefit under 35 U.S.C. §119(a) of an application filed in the Korean Intellectual Property Office on Aug. 31, 2005 and assigned Ser. No. 2005-80979, the entire contents of which are incorporated herein by reference.

BACKGROUND OF THE INVENTION

1. Field of the Invention

The present invention relates generally to a digital multimedia broadcasting system, and in particular, to a method and apparatus for supporting handover in a digital multimedia broadcasting system using a frame slicing technique.

2. Description of the Related Art

Currently, digital broadcasting is undergoing standardization based on various technologies by regions. For example, the standard broadcasting under discussion in China includes Digital Multimedia Broadcasting-Terrestrial (DMB-T), Advanced Digital Television Broadcasting-Terrestrial (ADTB-T), and Digital Video Broadcasting-Terrestrial (DVB-T).

DMB service is classified into Terrestrial DMB (DMB-T) and Satellite DMB (DMB-S) according to transmission media. In the world, Terrestrial DMB service is being deployed in Europe, and Satellite DMB takes initiative in the United States. Meanwhile, multimedia service including mobile TV service is expected to be deployed in the Far East region first in the world. A DMB-T transmission system is suitable for fixed terminals or portable/mobile terminals, but has a need for reduction in weight and power consumption to accommodate portable apparatuses and to reduce battery consumption.

Portable/mobile terminals have the following main requirements for the DMB-T system.

One requirement is power saving. Mobile portable terminals have lower required power consumption during radio frequency (RF) and baseband processing. However, in mobile portable terminals, average power consumption of supplemental receivers should be lower than this. This is because in the miniaturized environment, battery capacity is limited and heat dissipation is difficult. If new technology is introduced to mobile portable terminals in the future, a required decrement in power consumption can increase up to 90%.

Another requirement is smooth and seamless service handover. In a DMB-T Multi-Frequency Network (MFN), for mobile reception, there is a need to perform handover to another frequency if reception quality of the current frequency is too low. Because DMB-T does not include a seamless handover function, a change in the frequency causes service interruption. In addition, a receiver scans other available frequencies to find out which of them provides the best or sufficient reception quality. If the receiver does not include a separate RF stage for that purpose, the interruption occurs every time the receiver scans the frequencies. On the contrary, if the receiver includes a separate RF unit, the cost of the receiver increases. Therefore, there is a need to seamlessly perform handover and seamlessly scan a substitution frequency without the separate RF stage.

A further requirement is RF performance for mobile single antenna reception. A Carrier-to-Noise ratio (C/N) required for reception of RF signals is generally an important parameter that considerably affects the network cost, and especially affects the possibility of receiving a high-QoS (Quality of Service) service at a high reception rate.

A DVB transmission system mainly provides a bit rate of 10 Mbps or higher. Such a system introduces a Time Division Multiplexing (TDM)-based technique to make it possible to considerably reduce average power consumption of a DVB receiver. Such a technique is called a time slicing technique. A concept of the time slicing technique is to transmit data in bursts using a bit rate which is considerably higher than the bit rate required when data is continuously transmitted. A relative time until the start of the next burst is indicated by Δt (delta-t).

FIG. 1 is a diagram for a description of conventional time slicing. As illustrated, a terminal 100 is located in an overlapping area between a first cell (cell F1) 102 managing a first frequency F1, a second cell (cell F2) 104 managing a second frequency F2, and a third cell (cell F3) 106 managing a third frequency F3. Each of the cells 102 to 106 transmits the services available at its own frequency using the TDM technique, and repeats bursts of the same service at stated intervals. The services transmitted by each of the cells 102 to 106 may not be synchronized with each other.

For the terminal 100 receiving a service A from the cell F1 102, because data of an Element Stream (ES) is not transmitted between bursts of the service A, different ESs can use the bit rates allocated in different ways, as shown in FIG. 1. In this manner, the terminal 100 is activated only for the very short time where it receives bursts of the requested service. When the mobile portable terminal 100 requires a lower fixed bit rate, the required bit rate can be provided by buffering received bursts.

In order to obtain an appropriate power reduction effect, a burst bit rate should be at least 10 times the fixed bit rate of the provided service. For example, the bursts for a 350 Kbps streaming service should have a bit rate of about 4 Mbps. If the burst bit rate is 2 times the fixed bit rate, it can contribute to a power reduction of 50%, which does not reach the above-stated power reduction of 90%.

Power consumption differs according to a duty cycle of the time slicing technique. Estimation of power consumption takes into account not only the increase in power consumption due to Multi-Protocol Encapsulation—Forwarding Error Coding (MPE-FEC), but also the duty cycle. As a result, additional power consumption of 2 mW due to the use of a 0.13 μm technique and additional power consumption of 1 mW due to the use of a 0.18 μm technique for MPE-FEC are estimated.

It should be noted that such power consumption estimation is performed on the assumption that all Reed-Solomon (RS) codewords are always decoded. However, for a Moving Picture Experts Group-2 (MPEG-2) Transport Stream (TS), because it is already accurate and has no need for MPEG-FEC decoding, RS decoding is not used in a normal reception environment (especially in low low-rate reception environment) for the most time. Even though MPE-FEC is used, it is used only for the sub-set of the received burst. Therefore, in the complex reception environment (actual user environment), MPE-FEC consumes additional power of 2 mW on rare occasions, so an influence on battery time is not significant.

The time slicing technique can use a receiver to monitor adjacent cells for an off time. Switching between TSs for the off time does not cause interruption of the service reception. If bursts of a particular IP stream are synchronized between the adjacent cells through an appropriate action, the receiver can continuously receive the IP stream without a data loss when it is tuned to the adjacent cells. The time slicing technique aims at a reduction in power consumption at a mobile portable terminal.

Therefore, time slicing should be optimized from the viewpoint of a terminal. Such selection follows a DVB adoption rule that implementation in a receiver should be optimized because the number of receivers is much greater than the number of transmitters. In addition, commonly the implementation cost at a network is less important than the implementation cost at a terminal. The time slicing supports to enable receivers to monitor adjacent cells during off time. Performing switching between transport streams for an off period does not lead to interruption of service reception.

As illustrated in FIG. 1, the terminal 100 receives the service A from the F1 102, but the quality of the received service is low. Then the terminal 100 listens to (or searches for) other frequencies, i.e. F2 and F3, in off times 112 and 114 between bursts 110 of the service A. The terminal 100 listens to the F2 in the first off time 110, and the F3 in the second off time 114. The terminal 100 listens to the cell F2 104 and the cell F3 106 in the first and second off times 112 and 114, respectively, and compares the listening results to make a switch to the best cell.

FIG. 2 shows conventional handover by time slicing. A terminal receives a service A of one burst from a cell F1 in step 202. The cell F1 is a serving cell of the terminal. If a first off time starts as the burst of the service A terminates, the terminal listens to the signal quality to determine whether the service A exists in a cell F2 in step 204. In FIG. 1, the terminal listens to services B, C, D, E and F in the first off time 112 for the cell F2. Upon success in listening to the service A, the terminal stores, in step 206, the corresponding information, returns to the cell F1, and then turns the power off until the next burst of the service A starts. In step 208, the receiver receives the burst of the service A.

If a second off time starts as the burst of the service A terminates, the terminal listens to the signal quality to determine whether the service A exists in a cell F3 in step 210. In FIG. 1, the terminal listens to services D, E, F and A in the second off time 114 for the cell F3. Because the terminal has succeeded in listening to the service A, it stores, in step 212, the corresponding information, returns to the cell F1, and then turns the power off until the next burst of the service A starts. In step 214, the receiver receives bursts in the allocated time for the service A. If frequency listening for all adjacent cells except for the cell F1 is completed between the bursts of the service A, the terminal compares, in step 216, signal qualities for the adjacent cells from which it will receive the service A, to select the best cell, and then switches to the selected best cell to receive the service A.

The foregoing conventional time slicing technique has at least the following problems.

First, when listening to other cells, the terminal needs to be powered off until it listens to a desired service.

Second, a position of the service burst affects the listening result in the time slicing. Referring to FIG. 1, the reception quality of the service A deteriorates in the F1. During the first off time, the terminal listens to the F2. However, because a position of the service A in the F2 is equal to that in the F1, the terminal cannot find the service A, and thus returns to the F1. As a result, even though the service quality in the F2 is highest, the terminal cannot find the F2. In order to enable adjacent cells to transmit the same service through several different time slices at the same time, there is a burden that it should perform careful synchronization at a head end of the service.

SUMMARY OF THE INVENTION

To substantially solve at least the above problems and/or disadvantages and to provide at least the advantages below, the present invention provides a method and apparatus for overcoming service handover shortages of a DVB system based on frame slicing in a digital broadcasting system.

The present invention provides a transmission/reception apparatus and method for a digital multimedia broadcasting system, capable of reducing power consumption and providing smooth and seamless service handover.

According to one aspect of the present invention, there is provided a handover method in a DMB system that transmits/receives broadcast data through a frame group including a frame group header and signal frames of corresponding services, using different frequencies. The method includes receiving a first frame group header at a serving frequency to check a burst arrival time of a desired service, and receiving a burst of the desired service at the serving frequency according to the burst arrival time; turning power off until a current time arrives at a next header arrival time after receiving the burst of the desired service; receiving a second frame group header at a searching frequency different from the serving frequency, and acquiring service information of the searching frequency necessary for handover to the searching frequency if the current time arrives at the next header arrival time; and comparing signal power/quality of the listened frequencies with each other to select a best frequency, and switching to the selected frequency using the acquired corresponding service information.

According to another aspect of the present invention, there is provided a handover method in a DMB system that transmits/receives broadcast data through a frame group including a frame group header and signal frames of corresponding services, using different frequencies. The method includes receiving a first frame group header at a serving frequency to check a burst arrival time of a desired service, and receiving a burst of the desired service at the serving frequency according to the burst arrival time; receiving a signal frame at a searching frequency different from the serving frequency after receiving the burst of the desired service; calculating a relative start time of a nearest frame group header for the searching frequency using the received signal frame; turning power off until a current time arrives at a nearest header arrival time based on the relative start time; receiving a second frame group header at the searching frequency, and acquiring service information of the searching frequency necessary for handover to the searching frequency if the current time arrives at the nearest header arrival time; and returning to the serving frequency and turning the power off until a next burst arrival time of the desired service after receiving the second frame group header.

According to further another aspect of the present invention, there is provided a handover apparatus in a DMB system that transmits/receives broadcast data through a frame group including a frame group header and signal frames of corresponding services, using different frequencies. The apparatus includes an RF unit for frequency-down-converting a received RF-band broadcast signal, and evaluating power/quality of the received broadcast signal; a demodulator and decoder for demodulating and decoding the frequency-down-converted signal and outputting information bits; a handover decision unit for generating a handover command according to the evaluated signal power/quality; a frame slicing unit for, if the handover command is not generated, separating the information bits into a frame group header and a signal frame, and outputting, to the RF unit, a first control command for controlling power On/Off, according to relative time information obtained from the frame group header or the signal frame; and a handover controller for, if the handover command is generated, receiving the frame group header or the signal frame from the frame slicing unit along with the first control command, calculating a header arrival time and a relative start time of a desired service according to service information included in the frame group header and a signal frame number included in the signal frame, and outputting, to the RF unit, a second control command for controlling power On/Off according to the calculated relative start time.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF PREFERRED EMBODIMENTS

Preferred embodiments of the present invention will now be described in detail with reference to the annexed drawings. In the following description, a detailed description of known functions and configurations incorporated herein has been omitted for clarity and conciseness.

The present invention overcomes service handover shortages of existing digital broadcasting systems based on frame slicing in a DMB-T based DMB-Handheld (DMB-H) system.

Figure 1:
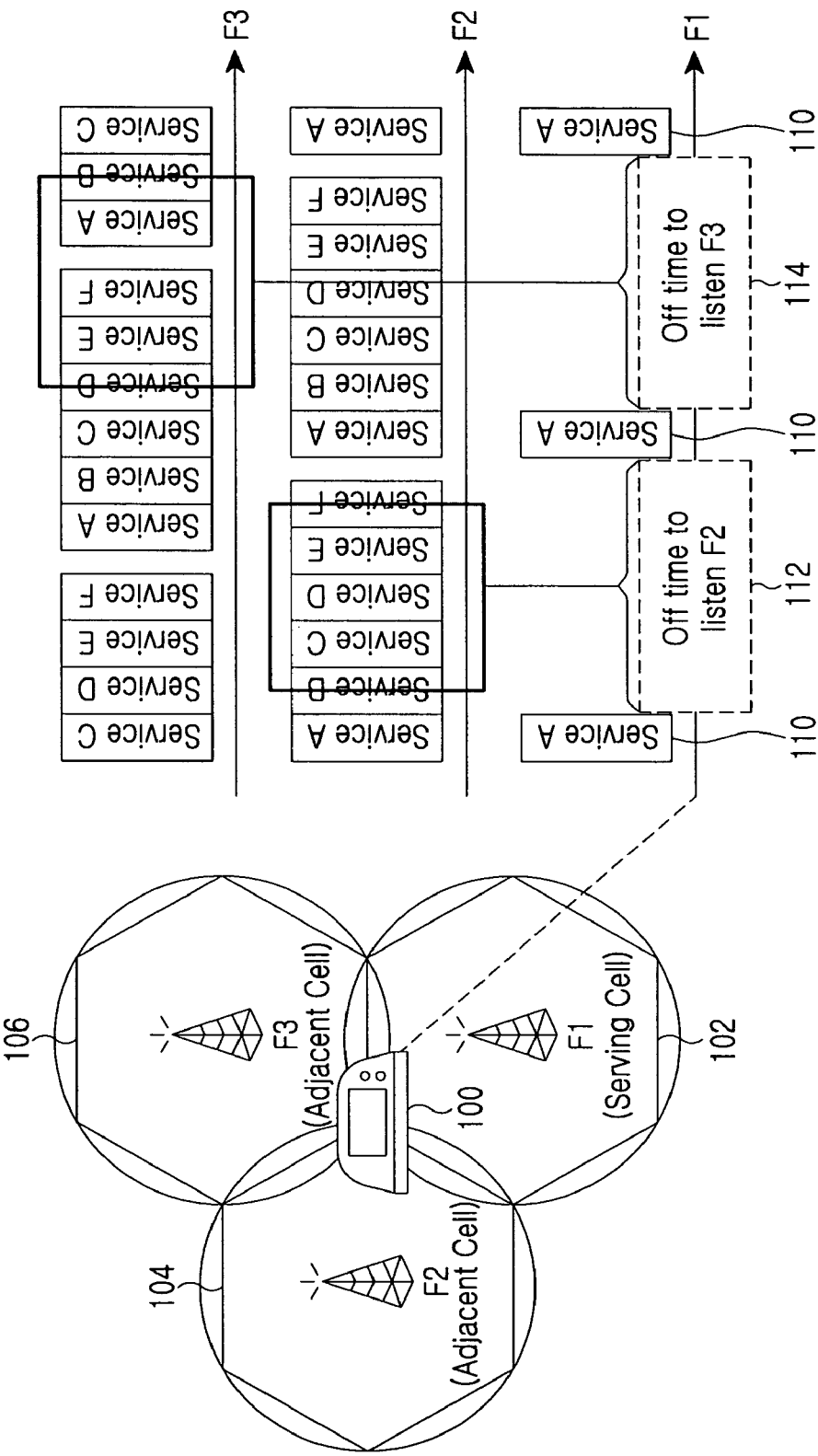
FIG. 1 is a diagram for a description of time slicing in a DMB system according to the prior art.
Figure 2:
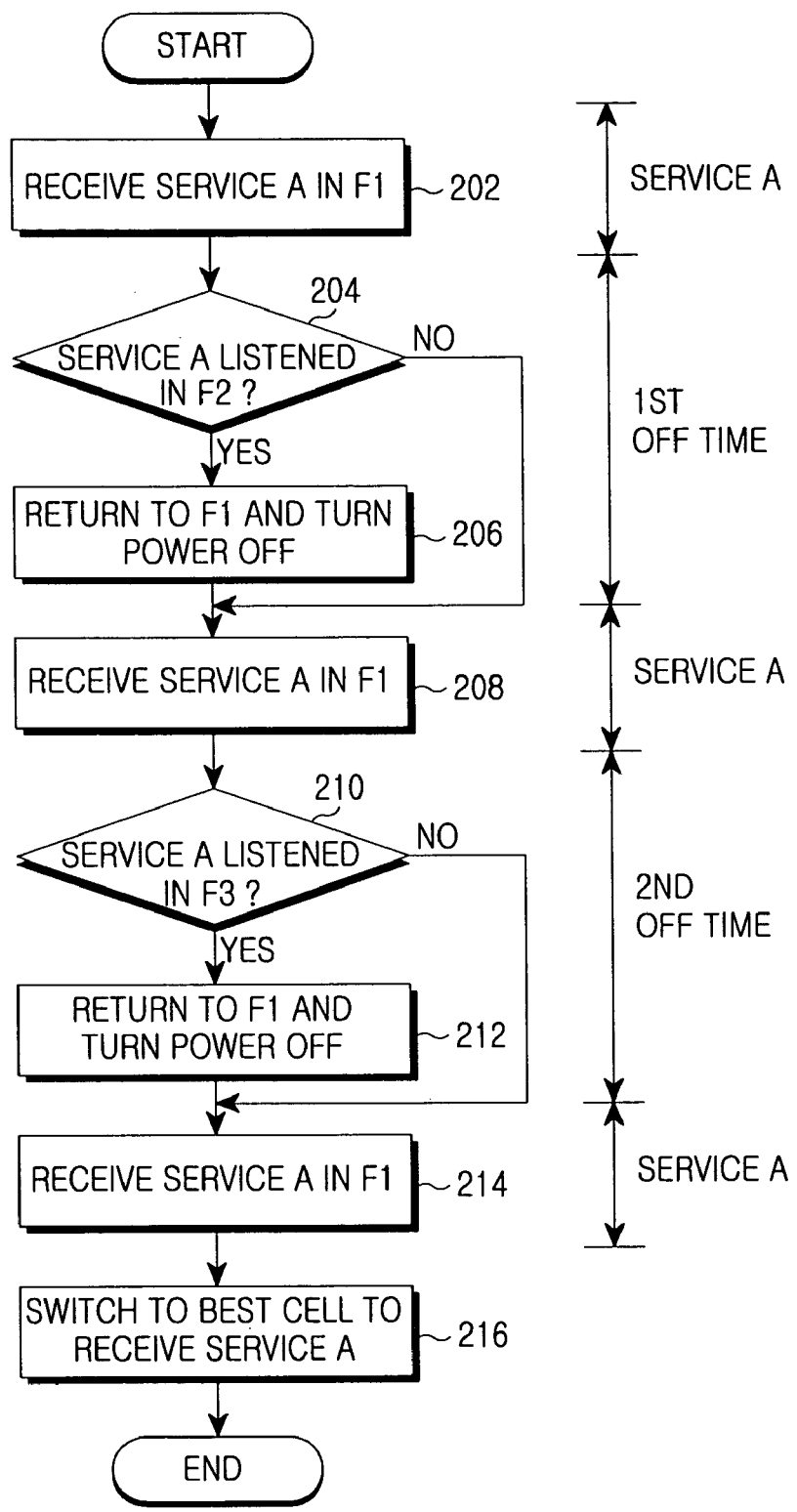
FIG. 2 is a flowchart illustrating handover by time slicing in a DMB system according to the prior art.
Figure 3:
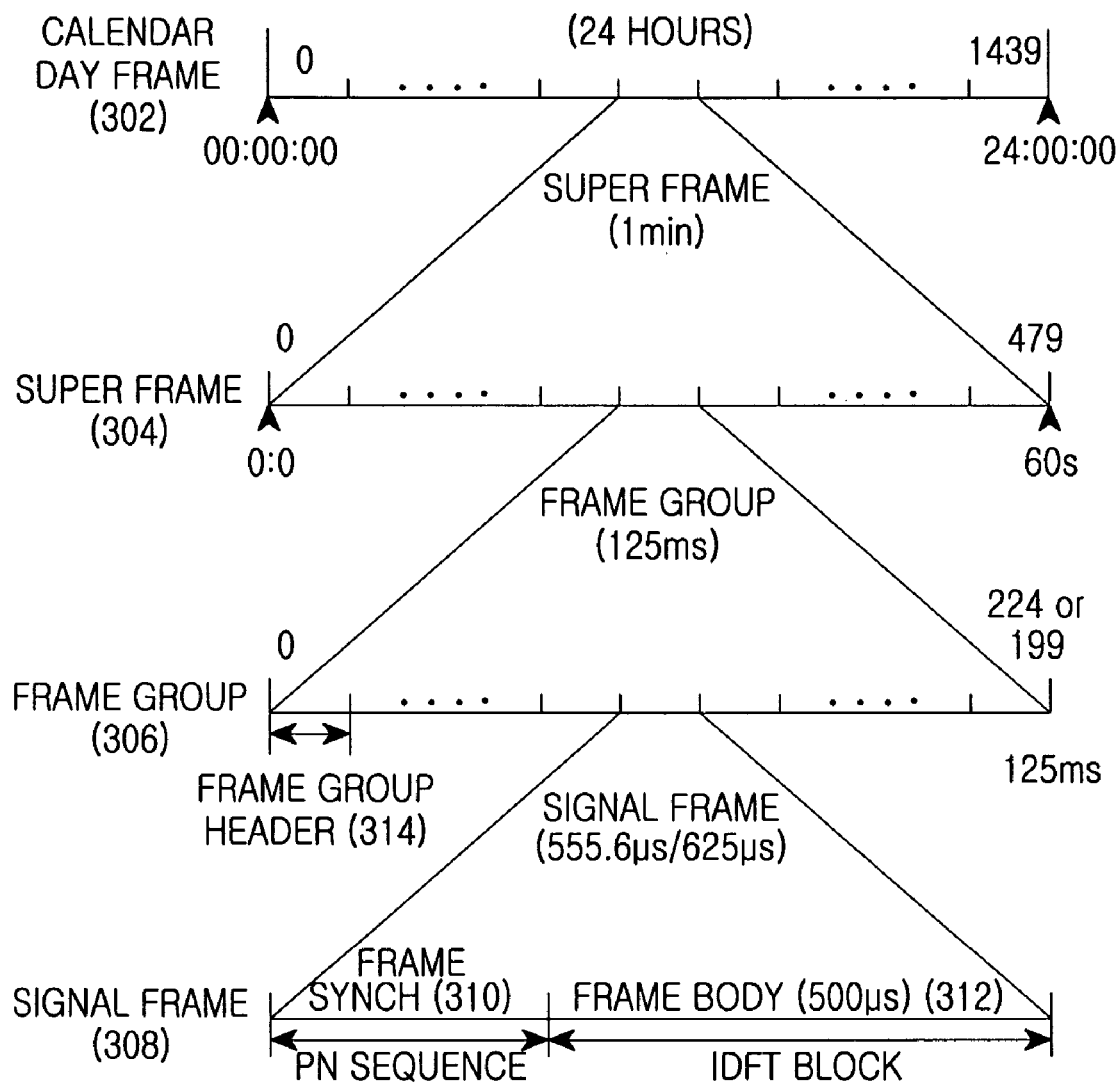
FIG. 3 is a diagram illustrating a frame structure of DMB-H according to the present invention.

FIG. 3 shows a frame structure of DMB-H according to the present invention. A signal frame 308 is composed of a guard interval (GI) 310 for frame synchronization, and a frame body or an Inverse Discrete Fourier Transform (IDFT) block 312, which is an actual data block. A pseudo noise (PN) sequence is inserted in the GI 310, and a GI size is ¼ or ⅛ of an IDFT block. Binary Phase Shift Keying (BPSK) modulation is used in the GI 310, for powerful frame synchronization.

Because an interval of a frame group 306 is 125 ms, one second is composed of 8 frame groups. Each signal frame 308 of the frame group 306 has a unique signal frame number (SFN), and frame synchronization is acquired through encoding of a PN sequence. A first signal frame of the frame group 306 is a frame group header 314, and is used for control of the frame group. In addition, complete MPEG2 TS packs exist in the frame group 306.

A super frame 304 is composed of 480 frame groups, and continues for one minute. The super frame 304 has a unique super frame number, and is encoded as each signal frame unit of the frame group 306. A calendar day frame 302 is composed of 1440 super frames, and is periodically repeated in units of natural days. In the selected time, the physical channel frame structure is reset and a new calendar day frame can start.

Figure 4:
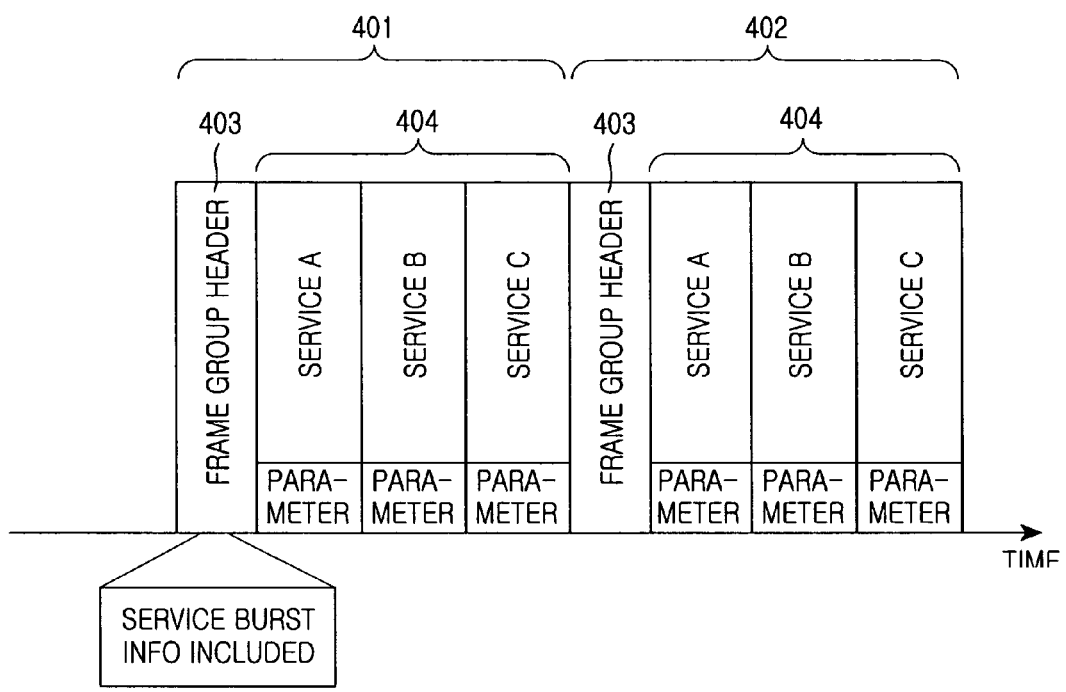
FIG. 4 is a diagram illustrating a structure of a frame group generated using a frame slicing technique according to the present invention.

FIG. 4 shows a frame group generated using a frame slicing technique according to the present invention. The frame slicing transmits information on the services included in the frame group using a frame group header. The information on the services includes identification information for the services included in the frame group, and a relative start time for the frame group header, at which a signal frame of each service starts.

Each frame group header 403 provides a terminal with service burst information 404 for services A, B and C transmitted through frame groups 401 and 402. Separate signaling can be used to inform the terminal whether the illustrated frame slicing structure is used. That is, because 36 Transmission Parameter Signaling (TPS) bits are included in each DMB-H signal frame, one of the TPS bits can be used for indicating whether the frame slicing is used.

Figure 5:
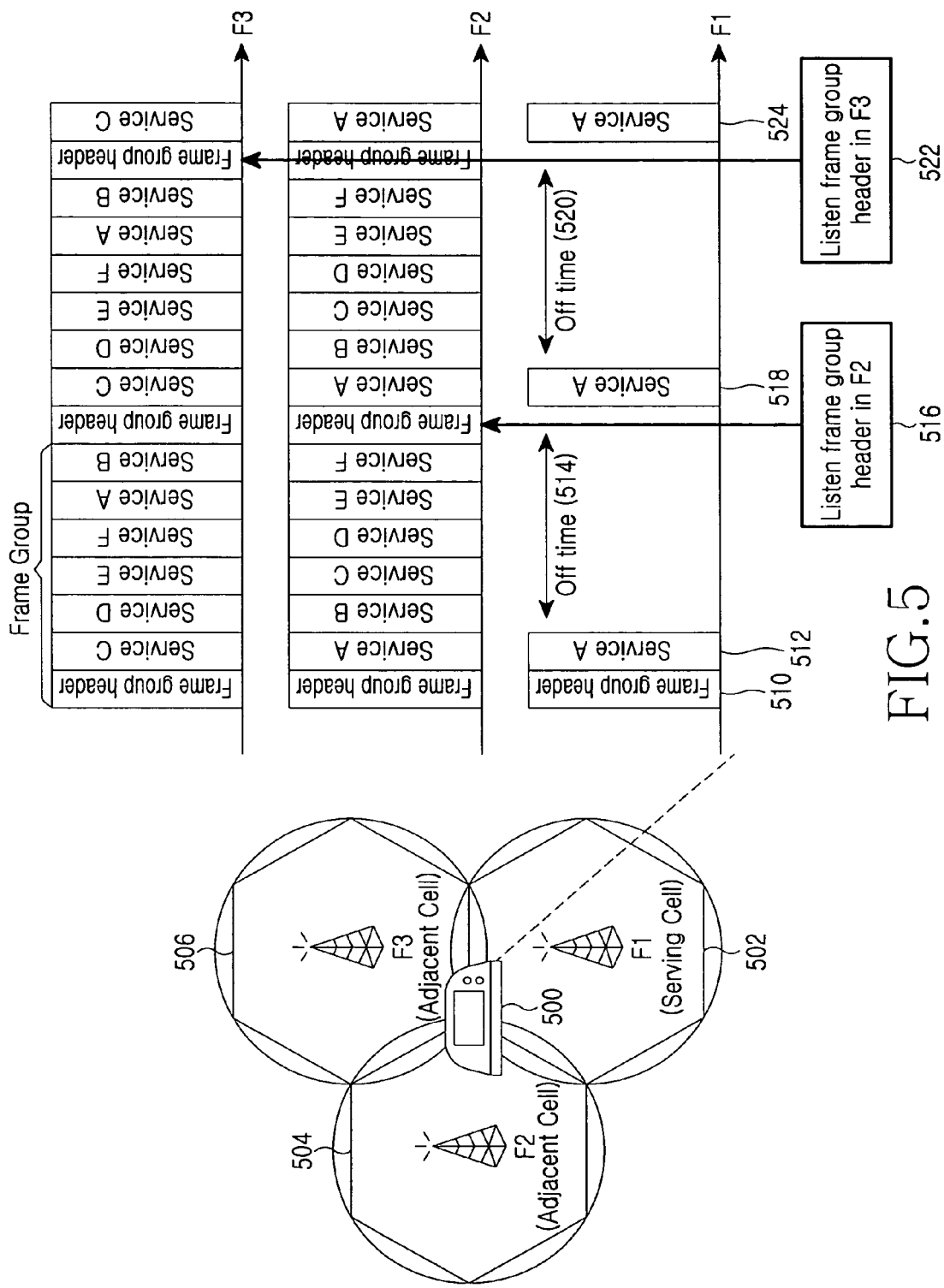
FIG. 5 is a diagram illustrating a handover procedure by frame slicing in synchronized cells according to the present invention.

Theoretically, when adjacent cells are synchronized with a serving cell, handover can be smoothly performed. FIG. 5 illustrates a handover procedure by frame slicing in synchronized cells according to the present invention. The synchronized cells transmit corresponding group headers at the same timing.

A terminal 500 is located in an overlapping area between a first cell (cell F1) 502 managing a first frequency F1, a second cell (cell F2) 504 managing a second frequency F2, and a third cell (cell F3) 506 managing a third frequency F3. The terminal 500 is receiving bursts of a service A from the cell F1 502. The cell F1 502 from which the terminal 500 is receiving the service A is referred to as a "serving cell" and the other cells are referred to as "adjacent cells." Each of the cells 502 to 506 transmits the services available at its own frequency using the TDM technique, and repeats bursts of the same service in units of frame group periods. Frame group headers 510, 516 and 522 transmitted from the cells 502 to 506 may not be synchronized with each other.

In this way, an arrival time of a frame group header (hereinafter referred to as a "header arrival time") from adjacent cells 504 and 506 is equal to a header arrival time from a serving cell 502. If the terminal 500 already knows the header arrival time from the serving cell 502 depending on preceding information, it can calculate a relative wait time and move to a desired adjacent cell at the corresponding time. Otherwise, the terminal 500 calculates a header arrival time based on the frame structure.

Specifically, the terminal 500 receives the frame group header 510 from the cell F1 502, and determines an arrival time of bursts 512, 518 and 524 of the service A from the cell F1 502. After receiving the first burst 512 of the service A, the terminal 500 turns the power off and then enters a first off time 514. In a normal situation, the terminal 500 maintains the power off state until an arrival time of the next burst 518 of the service A. However, in a handover situation, for example, in a situation where the signal quality of the cell F1 502 is very low, the terminal 500 wakes up immediately before a header arrival time based on the frame group period acquired from the frame group header 510, and reads the frame group header 516 of the cell F2 504. From the frame group header 516 of the cell F2 504, the terminal 500 acquires information indicating whether the cell F2 504 provides the service A, and an arrival time of the bursts of the service A from the cell F2 504.

Similarly, after receiving the second burst 518 of the service A, the terminal 500 turns the power off and then enters a second off time 520. Immediately before a header arrival time, the terminal 500 ends the second off time 520 and wakes up, and then reads the frame group header 522 of the cell F3 506. From the frame group header 522 of the cell F3 506, the terminal 500 acquires information indicating whether the cell F3 506 provides the service A, and an arrival time of the bursts of the service A from the cell F3 506.

Thereafter, the terminal 500 compares the listening results of the cell F2 504 with the listening results of the cell F3 506, and switches to the best cell from which it will receive the service A. That is, upon receipt of a user's request, or if it is determined that handover should be performed, the terminal 500 can switch to the cell F2 504 or the cell F3 506 according to the information acquired from the frame group headers 516 and 522, and receive the bursts of the service A.

In the DMB frame structure, an interval of a frame group is 125 ms, and every signal frame of the frame group has its own unique frame number. The signal frame number ranges between 0 and 224. If a received signal frame number is 'i', the terminal calculates a relative start time of the next frame group in accordance with Equation (1) below.

$$t=125-i*\text{``duration\_}j\text{''}[ms](i=0,\ldots,224;\sim j=1,2) \quad (1)$$

where duration_j denotes duration of one signal frame used in the DMB system, and has two types of lengths according to various lengths of the guard interval (GI). In addition, j denotes an index used for distinguishing the two types of the lengths. By checking which kind of guard interval is adapted, a value of the duration_j can be obtained from Table 1 below. A PN sequence is inserted in the GI.

TABLE 1

| Duration of one signal frame | | | | |
|---|---|---|---|---|
| Number of symbols in IDFT block | Percentage of guard interval to DFT block | Number of symbols in signal frame | j | Duration of one signal frame duration$_j$ (μs) |
| 3780 | 1/4 | 4725 | 1 | 625 |
|  | 1/9 | 4200 | 2 | 555.6 |

Referring to an example of FIG. 5, the terminal 500 is receiving the service A from the cell F1 502. When the service quality in the cell F1 502 deteriorates, the terminal 500 ends the off times 514 and 520 and then receives frame group headers 516 and 522 of the adjacent cells. After comparing the signal quality in the adjacent cells 504 and 506 with the signal quality in the serving cell 502, the terminal 500 selects the best cell for handover.

However, synchronization may not be accurately achieved between the cells because the cells are not cooperating with each other in terms of the signal quality, or the cells are in a poor transmission state. In this case, the terminal cannot find frame group headers of the adjacent cells at the scheduled time. If synchronization is not achieved between the adjacent cells in this way, the terminal listens to other cells during the off time. If a received signal frame number is 'i', the terminal can calculate a relative start time of the nearest frame group header using Equation (1). It is obvious that a start time of the frame group header is equal to a start time of the frame group.

After checking the relative start time of the nearest frame group header, the terminal maintains the power off state until an expected frame group header arrives, and the terminal can return to the original cell after acquiring desired service information from the arrived frame group header. Similarly, the terminal compares the signal qualities of several cells to select the best cell for handover.

One exception should be considered. If the nearest frame group header in the listening cell overlaps with the duration of the receiving service in the original cell, the terminal needs to listen to the current cell until it finds the desired service during the off time.

Figure 6:
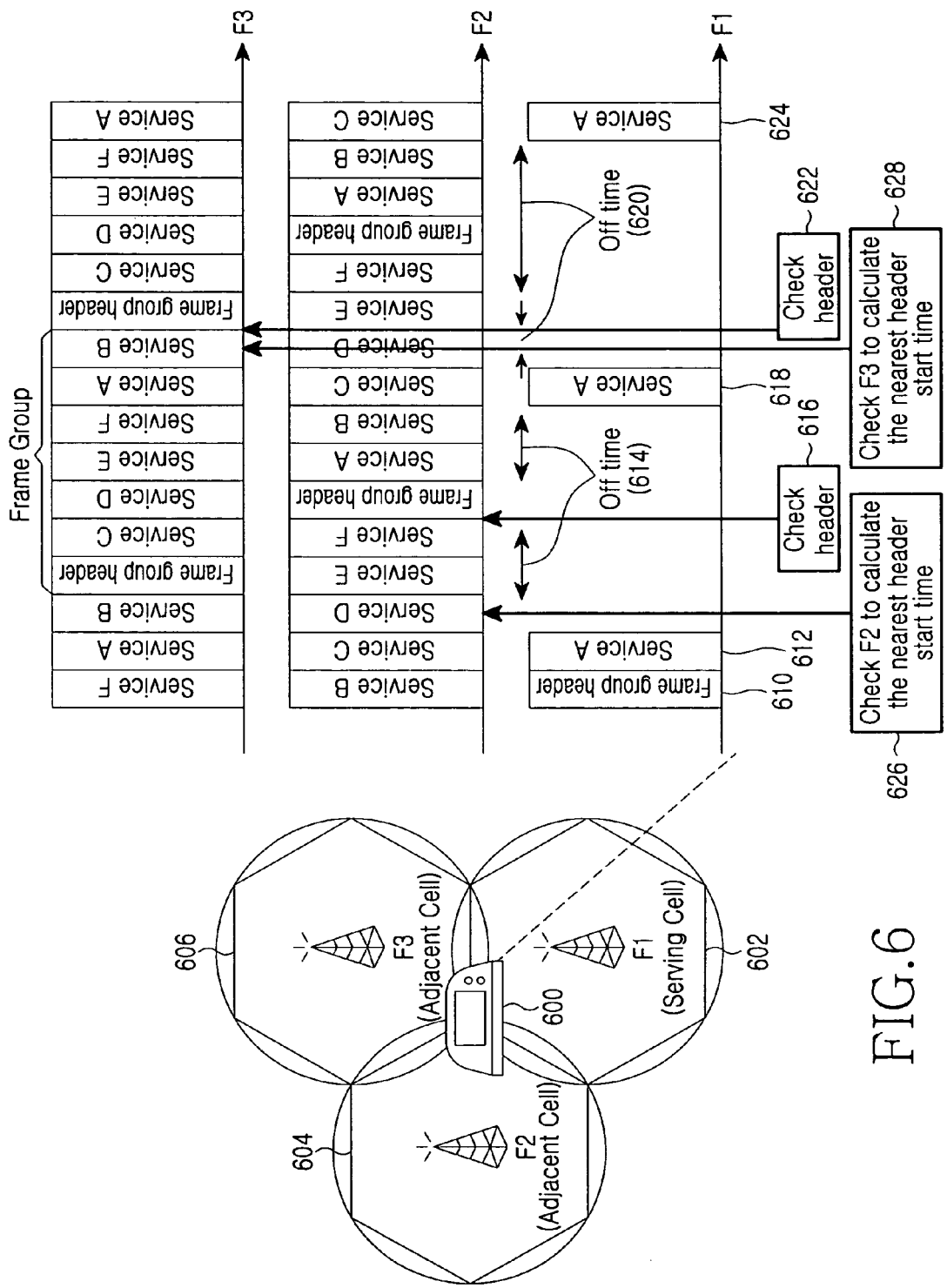
FIG. 6 is a diagram illustrating a handover procedure by frame slicing in unsynchronized cells according to the present invention.

FIG. 6 shows a handover procedure by frame slicing in unsynchronized cells according to the present invention. A terminal 600 is located in an overlapping area between a first cell (cell F1) 602 managing a first frequency F1, a second cell (cell F2) 604 managing a second frequency F2, and a third cell (cell F3) 606 managing a third frequency F3. The terminal 600 is receiving bursts of a service A. The cell F1 602 from which the terminal 600 is receiving the service A is referred to as a "serving cell" and the other cells are referred to as "adjacent cells." Each of the cells 602 to 606 transmits the services available at its own frequency using the TDM technique, and repeats bursts of the same service in units of frame group periods. Frame group headers 610, 616 and 622 transmitted from the cells 602 to 606 are not synchronized with each other.

The terminal 600 receives the frame group header 610 from the cell F1 602, and determines an arrival time of bursts 612, 618 and 624 of the service A from the cell F1 602. After receiving the first burst 612 of the service A, the terminal 600 turns the power off and then enters a first off time 614. In a normal situation, the terminal 600 maintains the power off state until an arrival time of the next burst 618 of the service A. However, in a handover situation, for example, in the situation where the signal quality of the cell F1 602 is very low, the terminal 600 receives a signal frame 626 of the cell F2 604 immediately after the burst 612 of the service A terminates, and then calculates a relative start time of the nearest frame group header 616 from the signal frame 626 of the cell F2 604. The "relative start time" refers to a time interval from the signal frame 626 till the frame group header 616.

The terminal 600 wakes up immediately before a header arrival time based on the calculated relative start time, and reads the frame group header 616 of the cell F2 604. From the frame group header 616 of the cell F2 604, the terminal 600 measures the signal quality for the cell F2 604, and at the same time, acquires information indicating whether the cell F2 604 provides the service A, and an arrival time of the bursts of the service A from the cell F2 604.

Similarly, after receiving the second burst 618 of the service A, the terminal 600 receives a signal frame 628 of the cell F3 606 before it turns the power off, and calculates a relative start time of the nearest frame group header 622 from the signal frame 628 of the cell F3 606. The terminal 600 wakes up immediately before a header arrival time based on the calculated relative start time, and reads the frame group header 622 of the cell F3 606. From the frame group header 622 of the cell F3 606, the terminal 600 measures the signal quality for the cell F3 606, and at the same time, acquires information indicating whether the cell F3 606 provides the service A, and an arrival time of the bursts of the service A from the cell F3 606.

The terminal 600 is powered off for an interval after it calculates a header arrival time of the listening cell after termination of each burst of the service A, before a header arrival time of the listening cell, and for an interval after the frame group header of the listening cell terminates, before a desired service burst of the serving cell starts. That is, upon receipt of a user's request, or if it is determined that handover should be performed, the terminal 600 can switch to the cell F2 604 or the cell F3 606 according to the information acquired from the frame group headers 616 and 622, and receive the bursts of the service A.

When handover is needed, the terminal processes it as done in the synchronized case. If the received data is not a frame group header in the expected time, it means that the adjacent cells are not synchronized, and the terminal needs to deal with it as done in the unsynchronized case. In both cases, there is also no request about the position of service.

Figure 7:
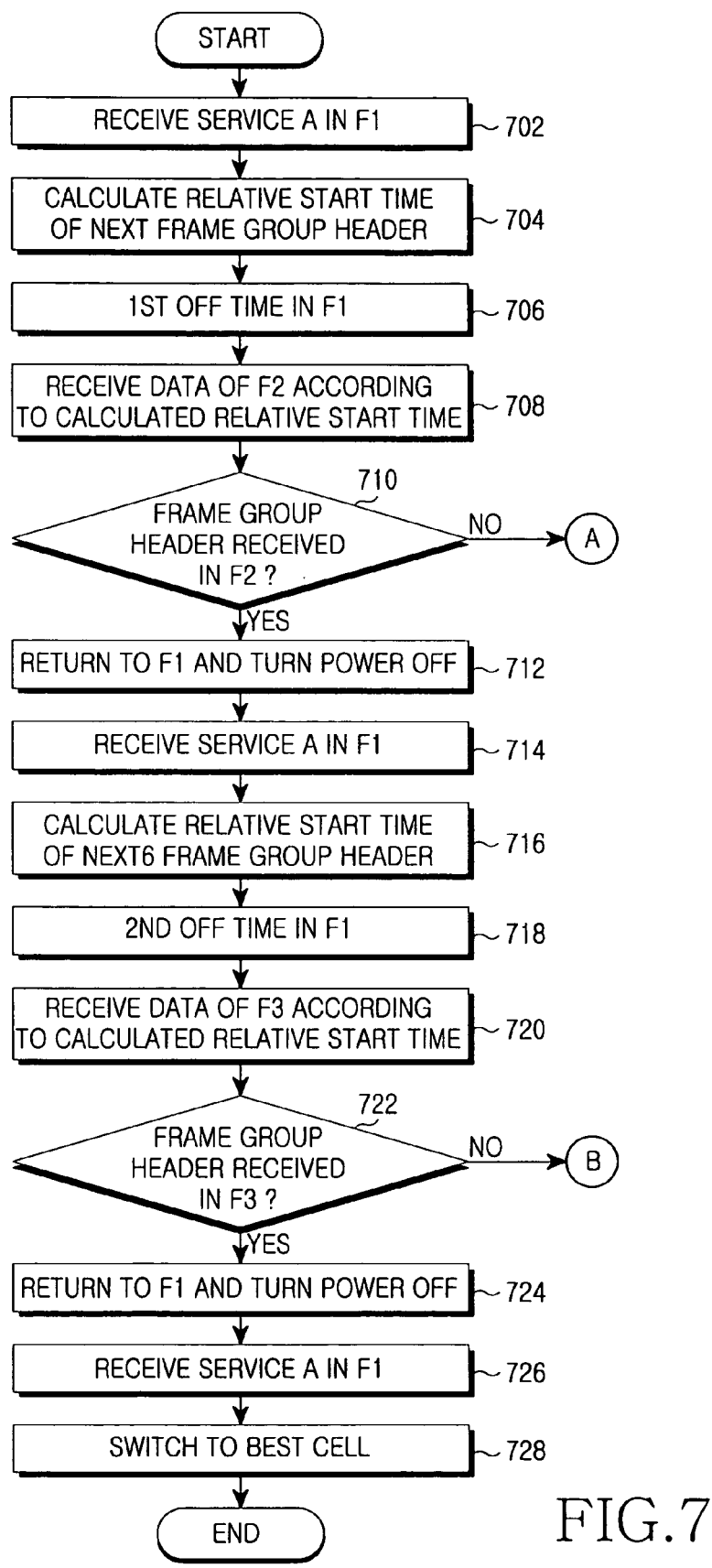
FIG. 7 is a flowchart illustrating a handover procedure in synchronized cells according to the present invention.
Figure 8A:
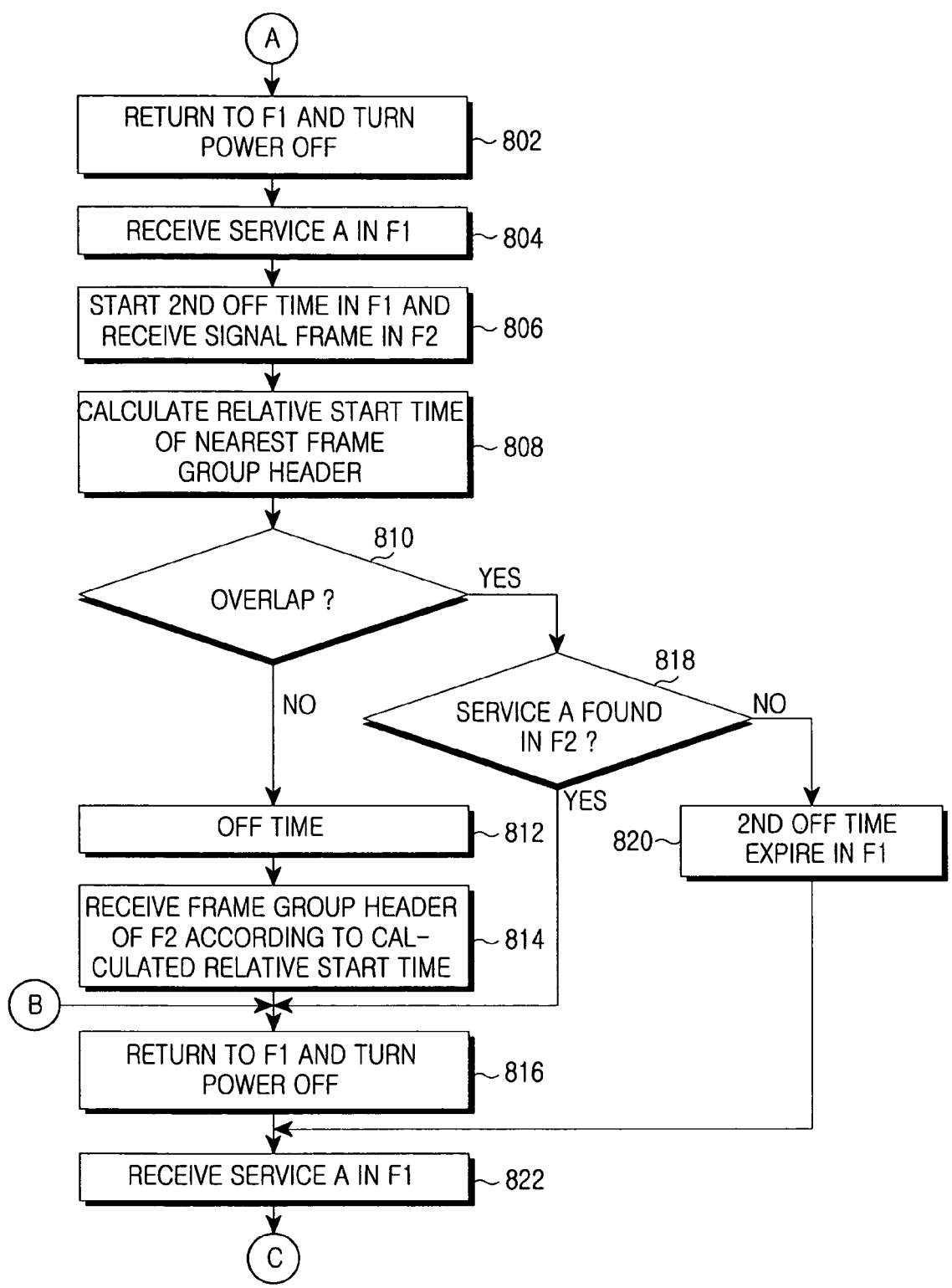
FIGS. 8A and 8B are diagrams illustrating a handover procedure in unsynchronized cells according to the present invention.
Figure 8B:
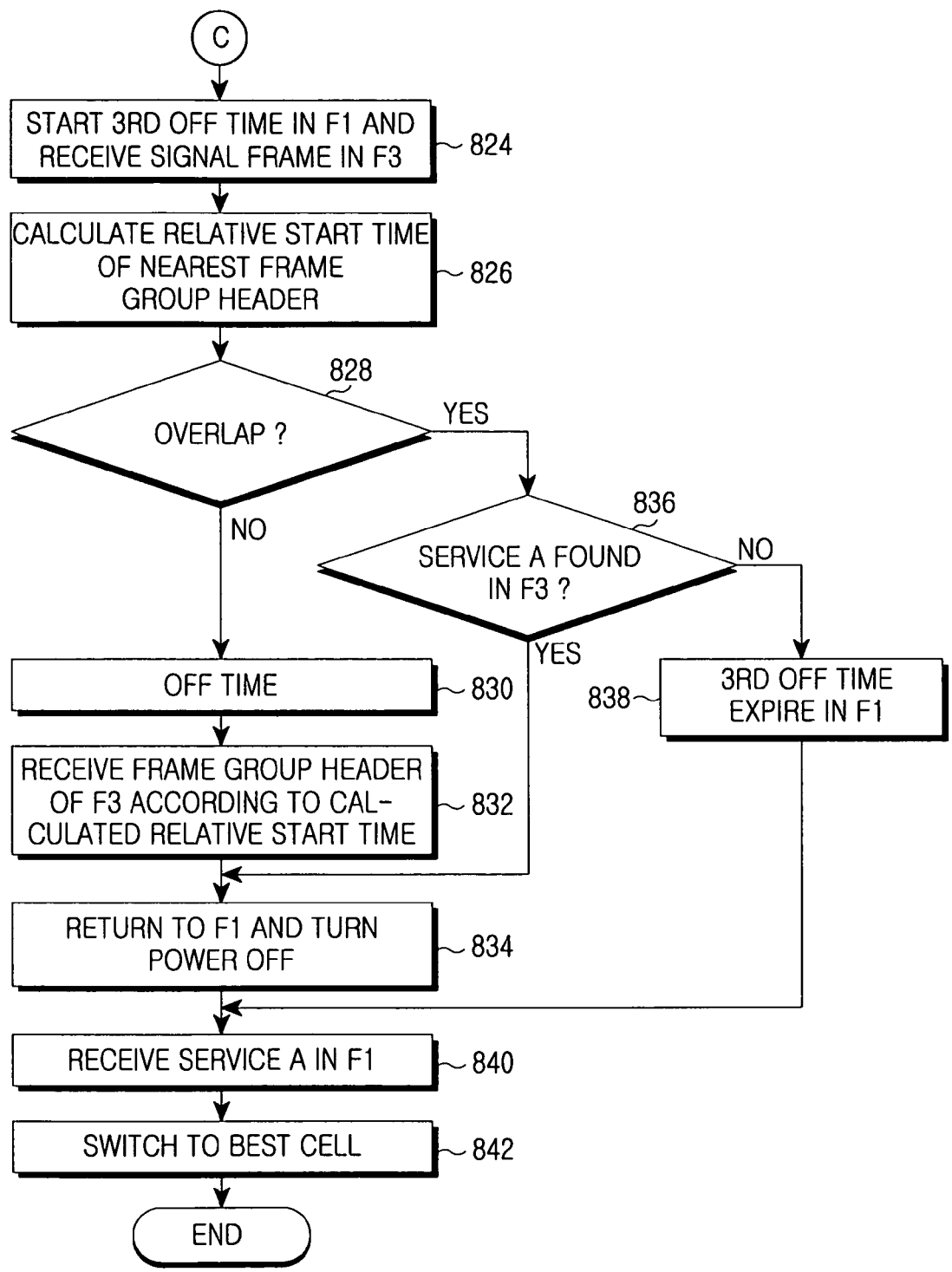

FIG. 7 shows a handover procedure in synchronized cells according to the present invention, and FIGS. 8A and 8B show a handover procedure in unsynchronized cells according to the present invention. If all cells in the system are synchronized or unsynchronized, step 710 of determining whether a frame group header is received is unnecessary in FIG. 7. Instead, the terminal receives a frame group header of another cell at a previously known time when all the cells are synchronized, and the terminal receives a frame group header or a signal frame when all the cells are unsynchronized. In FIGS. 7, 8A and 8B, the terminal analyzes a frame group header in the current cell, to detect the types of the services provided from the current cell and an arrival time for each of the services.

Referring to FIG. 7, a terminal receives one burst of a service A from a cell F1 in step 702. The terminal starts a handover procedure upon detecting deterioration of the signal quality of the cell F1. After completely receiving the burst of the service A, the terminal calculates a relative start time of the next frame group header based on the service information obtained from the frame group header of the cell F1 in step 704. In step 706, the terminal maintains its off time until the current time arrives at the next header arrival time based on the calculated relative start time. In step 708, the terminal listens to a cell F2 at the next header arrival time to receive data of the cell F2, and at the same time, measures signal power and quality of the cell F2.

In step 710, the terminal determines whether the data received from the cell F2 is a frame group header. If the received data is a frame group header, the terminal proceeds to step 712, because the cell F2 is synchronized with the cell F1, which is a serving cell, and the terminal can acquire service information necessary for handover to the cell F2 from the received frame group header. Otherwise, because it means that the cell F2 is unsynchronized with the cell F1, the terminal proceeds to step 802 of FIG. 8A indicating the unsynchronized case.

In step 712, the terminal returns to the cell F1, and then enters back the off time. If it arrives at an arrival time of the service A in the cell F1, the terminal receives a burst of the service A from the cell F1 in step 714. Similarly, in step 716, the terminal calculates a relative start time of the next frame group header. In step 718, the terminal maintains its off time until the current time arrives at the next header arrival time based on the calculated relative start time. In step 720, the terminal listens to a cell F3 at the next header arrival time to receive data of the cell F3, and at the same time, measures signal power and quality of the cell F3.

In step 722, the terminal determines whether the data received from the cell F3 is a frame group header. If the received data is a frame group header, the terminal proceeds to step 724, because the cell F3 is synchronized with the cell F1, which is a serving cell, and the terminal can acquire service information necessary for handover to the cell F3 from the received frame group header. Otherwise, because it means that the cell F3 is unsynchronized with the cell F1, the terminal proceeds to step 816 of FIG. 8A indicating the unsynchronized case.

In step 724, the terminal returns to the cell F1, and then enters back the off time. If it arrives at an arrival time of the service A in the cell F1, the terminal receives a burst of the service A from the cell F1 in step 726. If listening to all adjacent cells (i.e. cell F2 and cell F3) is completed in this way, the terminal compares the signal qualities of the adjacent cells with the signal quality of the serving cell, and switches to the best cell having the optimal service power/quality according to the acquired service information of the corresponding cell in step 728. After switching to the best cell, the terminal receives a burst of the service A from the best cell depending on the frame group header of the corresponding cell, received in step 708 or step 720. Although not separately described, the terminal can perform handover to a corresponding adjacent cell any time if it acquires service information for the adjacent cell and knows the presence of a desired service in the adjacent cell. Through this handover procedure, the terminal maintains the highest signal quality of the service A.

Referring to FIGS. 8A and 8B, step 802 branches from step 710 of FIG. 7. Alternatively, if the terminal previously knows that the adjacent cells are unsynchronized with the serving cell, it can directly perform step 802 without performing the steps of FIG. 7.

In step 802, the terminal maintains the off time in the cell F1. Upon arrival at a burst arrival time of the service A, the terminal receives a burst of the service A from the cell F1 in step 804. After completely receiving the burst of the service A, the terminal starts a second off time in the cell F1, and at the same time, receives a signal frame from the cell F2 and measures signal power and quality of the cell F2, in step 806. In step 808, the terminal calculates a relative start time of the nearest frame group header for the cell F2, using a signal frame number included in the signal frame received from the cell F2.

In step 810, the terminal determines whether the nearest header arrival time based on the relative start time of the nearest frame group header overlaps with a service-A arrival time of the cell F1 already checked from the frame group header of the cell F1. If they do not overlap with each other, the terminal maintains the off time until the current time arrives at the nearest header arrival time of the cell F2 in step 812. In step 814, the terminal receives a frame group header of the cell F2 at the nearest header arrival time of the cell F2 and acquires service information necessary for handover to the cell F2. Thereafter, in step 816, the terminal returns to the cell F1 and then is powered off.

However, if it is determined in step 810 that the nearest header arrival time overlaps with the service-A arrival time, the terminal receives, in step 818, frames of the cell F2 while maintaining the cell F2 until it finds a burst of the service A. If the terminal fails to find the burst of the service A in the cell F2 until the second off time for listening to the cell F1 expires, the terminal returns to the cell F1 in step 820 when the second off time of the cell F1 expires. However, if the terminal finds the burst of the service A in the cell F2, it stores the signal frame containing the burst of the service A for the cell F2, and then proceeds to step 816.

Step 822 begins from step 816 or step 820. In step 822, the terminal receives a burst of the service A of the cell F1 at the already checked service-A arrival time of the cell F1. After completely receiving the burst of the service A, the terminal starts a third off time in the cell F1, and at the same time, receives a signal frame from the cell to which it intends to listen next, i.e. the cell F3, and measures signal power and quality of the cell F3, in step 824. In step 826, the terminal calculates a relative start time of the nearest frame group header for the cell F3, using a signal frame number included in the signal frame received from the cell F3.

In step 828, the terminal determines whether the nearest header arrival time based on the relative start time of the nearest frame group header overlaps with the service-A arrival time of the cell F1 already checked from the frame group header of the cell F1. If they do not overlap with each other, the terminal maintains the off time until the current time arrives at the nearest header arrival time of the cell F3 in step 830. In step 832, the terminal receives a frame group header of the cell F3 at the nearest header arrival time of the cell F3 and acquires service information necessary for handover to the cell F3. Thereafter, in step 834, the terminal returns to the cell F1 and then is powered off.

However, if it is determined in step 828 that the nearest header arrival time overlaps with the service-A arrival time, the terminal receives, in step 836, frames of the cell F3 while maintaining the cell F3 until it finds a burst of the service A. If the terminal fails to find the burst of the service A in the cell F3 until the third off time for listening to the cell F3 expires, the terminal returns to the cell F1 in step 838 when the third off time of the cell F1 expires. However, if the terminal finds the burst of the service A in the cell F3, it stores the signal frame containing the burst of the service A for the cell F3, and then proceeds to step 834.

Step 840 begins from step 834 or step 838. In step 840, the terminal receives a burst of the service A of the cell F1 at the already checked service-A arrival time of the cell F1. If listening to all adjacent cells (i.e. cell F1 and cell F2) is completed in this way, the terminal compares the signal qualities of the adjacent cells with the signal quality of the serving cell, and switches to the best cell having the optimal service power/quality according to the comparison result in step 842. After switching to the best cell, the terminal receives a burst of the service A from the best cell depending on service information acquired from the frame group header of the corresponding cell in step 814 or step 832. In another case, the terminal receives a burst of the service A from the best cell depending on a signal frame containing the burst of the service A, acquired in step 818 or step 836. Although not separately described, the terminal can perform handover to a corresponding adjacent cell any time if it acquires service information for the adjacent cell and knows the presence of a desired service in the adjacent cell. Through this handover procedure, the terminal maintains the highest signal quality of the service A even while moving between the cells.

Figure 9:
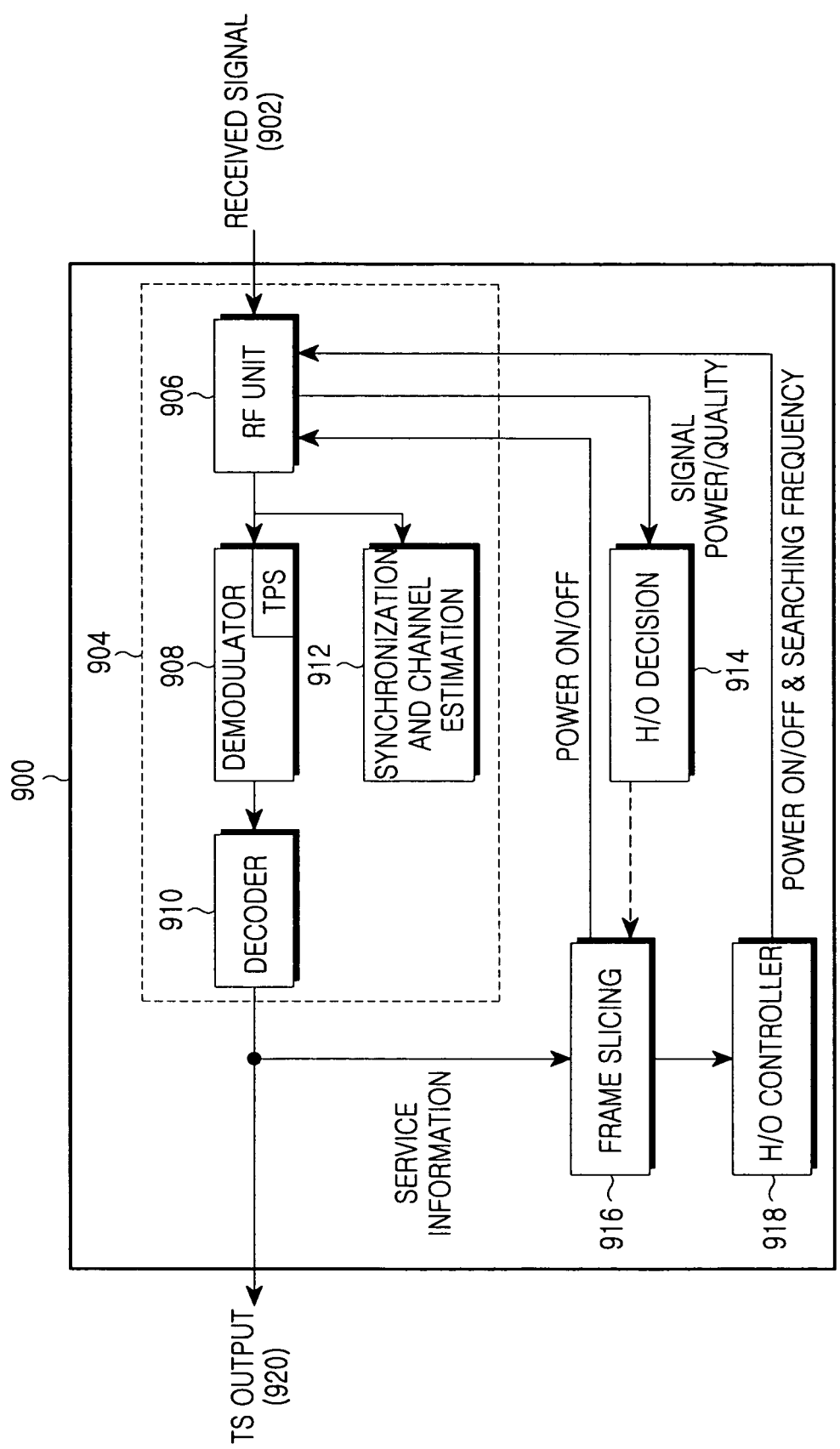
FIG. 9 is a diagram illustrating a conceptual structure of a DMB receiver according to the present invention.

FIG. 9 shows a DMB receiver according to the present invention. As illustrated, a receiver 900 includes a reception circuit 904, a handover (H/O) decision unit 914, a frame slicing unit 916, and a handover controller 918, in order to obtain a TS stream 920 from a received signal 902. The reception circuit 904 is composed of an RF unit 906, a demodulator 908, a decoder 910, and a synchronization and channel estimation unit 912.

The RF unit 906 performs down conversion on a received RF-band broadcast signal, evaluates power and quality of the received broadcast signal, and notifies the evaluation result to the handover decision unit 914. In the general case, the RF unit 906 turns the power off according to a first control command from the frame slicing unit 916. In case of handover, the RF unit 906 turns the power off and changes a searching frequency (or listening frequency) according to a second control command from the handover controller 918.

The demodulator 908 demodulates a baseband signal provided from the RF unit 906. The demodulator 908 extracts TPS information from some carriers used for the TPS information. The TPS information is provided to the demodulator 908, the decoder 910, and the frame slicing unit 916 according to information fields included therein. The decoder 910 decodes the demodulated signal from the demodulator 908, and outputs information bits.

The synchronization and channel estimation unit 912 performs time/frequency synchronization, channel estimation, and equalization depending on a PN sequence included in a frame synchronization part in the baseband signal provided from the RF unit 906.

The handover decision unit 914 determines whether there is a need for handover according to a signal power/quality parameter provided from the RF unit 906. If the signal power/quality is lower than a threshold, the handover decision unit 914 determines that there is a need for handover. If there is a need for handover, the handover decision unit 914 sends a handover command to the frame slicing unit 916.

The frame slicing unit 916 performs a general frame slicing operation. That is, the frame slicing unit 916 divides the information bits from the decoder 910 into a frame group header and signal frames according to the fame-sliced frame group structure, and distinguishes service bursts included in the signal frames. In addition, the frame slicing unit 916 determines a terminal turn-On/Off time according to relative time information obtained from the frame group header or the signal frames, and outputs a first control command for controlling power On/Off, to the RF unit 906. Upon receipt of the handover command from the handover decision unit 914, the frame slicing unit 916 stops the general frame slicing operation and outputs the first control command to the handover controller 918.

The handover controller 918 receives the frame group header or the signal frame from the frame slicing unit 916 along with the first control command, and calculates a header arrival time and a relative start time of a desired service according to service information included in the frame group header or a signal frame number included in the signal frame. Specifically, the handover controller 918 determines a terminal turn-On/Off time and a used frequency according to the operation of FIGS. 7, 8A and 8B, and provides the second control command for controlling power On/Off of the RF unit 906, and the used frequency, to the RF unit 906.

As can be understood from the foregoing description, the present invention can efficiently perform handover both in one case where DMB cells are synchronized and in another case where the DMB cells are unsynchronized. According to the proposed calculation method, the terminal can determine the expected turn On/Off time, thereby reducing power consumption. In addition, the present invention can successfully perform handover regardless of collision of service positions.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A handover method, by a handover controller, in a digital multimedia broadcasting (DMB) system that transmits/receives broadcast data through a frame group including a frame group header and signal frames of corresponding services, using different frequencies, the method comprising the steps of:

receiving, by the handover controller, a first frame group header at a serving frequency to check a burst arrival time of a desired service, and receiving a burst of the desired service at the serving frequency according to the burst arrival time;

turning power off, by the handover controller, until a current time arrives at a next header arrival time;

receiving, by the handover controller, a second frame group header at a searching frequency different from the serving frequency, and acquiring service information of the searching frequency necessary for handover to the searching frequency at the next header arrival time; and comparing, by the handover controller, signal power/quality of the listened frequencies with each other to select a best frequency, and switching to the selected frequency using the acquired corresponding service information.

2. The handover method of claim 1, wherein the handover controller further performs the steps of:

returning to the serving frequency and turning the power off until the next burst arrival time of the desired service upon failure to receive the second frame group header at the searching frequency according to the next header arrival time;

receiving a next burst of the desired service at the serving frequency according to the next burst arrival time;

receiving a signal frame at the searching frequency after receiving the next burst of the desired service;

calculating a second relative start time of a nearest frame group header for the searching frequency using the received signal frame;

turning the power off until the current time arrives at a nearest header arrival time based on the second relative start time;

receiving the second frame group header at the searching frequency when the current time arrives at the nearest header arrival time; and returning to the serving frequency, and turning the power off until the next burst arrival time of the desired service after receiving the second frame group header.

3. The handover method of claim 2, wherein the handover controller further performs the steps of:

determining whether the nearest header arrival time overlaps with the next burst arrival time of the desired service;

listening to the searching frequency until a burst of the desired service is received at the searching frequency when the nearest header arrival time overlaps with the next burst arrival time of the desired service;

returning to the serving frequency and turning the power off when a burst of the desired service is found at the searching frequency; and returning to the serving frequency and receiving the burst of the desired service when a burst of the desired service is not found at the searching frequency until the current time arrives at the next burst arrival time of the desired service.

4. The handover method of claim 3, wherein the second relative start time of the nearest frame group header is a value determined by subtracting a product of a signal frame number of the received signal frame and a duration of one signal frame, from a duration length of the frame group.

5. The handover method of claim 4, wherein the duration of one signal frame is 625 µs or 555.6 µs according to percentage of a guard interval to a frame body included in one signal frame.

6. A handover method, by a handover controller, in a digital multimedia broadcasting (DMB) system that transmits/receives broadcast data through a frame group including a frame group header and signal frames of corresponding services, using different frequencies, the method comprising the steps of:

receiving, by the handover controller, a first frame group header at a serving frequency to check a burst arrival time of a desired service, and receiving a burst of the desired service at the serving frequency according to the burst arrival time;

receiving, by the handover controller, a signal frame at a searching frequency different from the serving frequency after receiving the burst of the desired service;

calculating, by the handover controller, a relative start time of a nearest frame group header for the searching frequency using the received signal frame;

turning power off, by the handover controller, until the current time arrives at a nearest header arrival time based on the relative start time;

receiving, by the handover controller, a second frame group header at the searching frequency, and acquiring service information of the searching frequency necessary for handover to the searching frequency when the current time arrives at the nearest header arrival time; and returning, by the handover controller, to the serving frequency and turning the power off until a next burst arrival time of the desired service after receiving the second frame group header.

7. The handover method of claim 6, wherein the handover controller further performs the steps of:

determining whether the nearest header arrival time overlaps with the next burst arrival time of the desired service;

listening to the searching frequency until a burst of the desired service is received at the searching frequency when the nearest header arrival time overlaps with the next burst arrival time of the desired service;

returning to the serving frequency and turning the power off when a burst of the desired service is found at the searching frequency; and returning to the serving frequency and receiving the burst of the desired service when a burst of the desired service is not found at the searching frequency until the current time arrives at the next burst arrival time of the desired service.

8. The handover method of claim 7, wherein a second relative start time of the nearest frame group header is a value determined by subtracting a product of a signal frame number of the received signal frame and a duration of one signal frame, from a duration length of the frame group.

9. The handover method of claim 8, wherein the duration of one signal frame is 625 µs or 555.6 µs according to percentage of a guard interval to a frame body included in one signal frame.

10. The handover method of claim 6, wherein the handover controller further performs the steps of:

receiving data at the searching frequency;

determining whether the received data is a signal frame or a frame group header;

returning to the step of calculating the relative start time when the received data is the signal frame; and acquiring service information at the searching frequency necessary for handover to the searching frequency, from the received frame group header when the received data is the frame group header.

* * * * *